United States Patent  (10) Patent No.: US 10,627,712 B2
Nojima  (45) Date of Patent: Apr. 21, 2020

(54) WAVELENGTH CONVERSION ELEMENT, METHOD FOR MANUFACTURING WAVELENGTH CONVERSION ELEMENT, ILLUMINATOR, AND PROJECTOR

(71) Applicant: SEIKO EPSON CORPORATION, Tokyo (JP)

(72) Inventor: Shigeo Nojima, Azumino (JP)

(73) Assignee: SEIKO EPSON CORPORATION, Tokyo (JP)

( * ) Notice: Subject to any disclaimer, the term of this patent is extended or adjusted under 35 U.S.C. 154(b) by 0 days.

(21) Appl. No.: 16/365,044

(22) Filed: Mar. 26, 2019

(65) Prior Publication Data
US 2019/0302591 A1   Oct. 3, 2019

(30) Foreign Application Priority Data
Mar. 27, 2018   (JP) ................................. 2018-059329

(51) Int. Cl.
*F21V 9/00* (2018.01)
*G03B 21/20* (2006.01)

(52) U.S. Cl.
CPC ....... *G03B 21/204* (2013.01); *G03B 21/2066* (2013.01)

(58) Field of Classification Search
CPC .............................. G02B 6/008; G03B 21/204
USPC .......................................................... 362/84
See application file for complete search history.

(56) References Cited

U.S. PATENT DOCUMENTS

| 2016/0091712 A1* | 3/2016 | Egawa | G03B 21/204 |
| | | | 353/31 |
| 2016/0252722 A1* | 9/2016 | Li | G02B 26/008 |
| | | | 362/84 |
| 2017/0052362 A1* | 2/2017 | Chou | G02B 26/008 |
| 2017/0293211 A1* | 10/2017 | Kobayashi | G03B 21/00 |
| 2019/0249833 A1* | 8/2019 | Hsu | G03B 21/204 |

FOREIGN PATENT DOCUMENTS

JP   2014-192127 A   10/2014
JP   2016-070947 A   5/2016

* cited by examiner

*Primary Examiner* — Matthew J. Peerce
(74) *Attorney, Agent, or Firm* — Oliff PLC (57) ABSTRACT

A wavelength conversion element according to an aspect of the invention includes a base having a reflection surface, a wavelength conversion section that has a first surface on which excitation light is incident and a second surface facing away from the first surface and converts the excitation light in terms of wavelength into fluorescence, and a bonding section that bonds the wavelength conversion section to the base. Bonding the wavelength conversion section to the base via the bonding section with the reflection surface and the second surface separate from each other provides an air layer in part of the space between the reflection surface and the second surface, and at least part of a portion of the first surface that is the portion facing the air layer is a light incident area on which the excitation light is incident.

14 Claims, 3 Drawing Sheets

WAVELENGTH CONVERSION ELEMENT, METHOD FOR MANUFACTURING WAVELENGTH CONVERSION ELEMENT, ILLUMINATOR, AND PROJECTOR

BACKGROUND

1. Technical Field

The present invention relates to a wavelength conversion element, a method for manufacturing the wavelength conversion element, an illuminator, and a projector.

2. Related Art

In recent years, as an illuminator for a projector, an illuminator using a wavelength converter, such as a rotary fluorescent plate, has been proposed. The rotary fluorescent plate produces fluorescence when a phosphor layer is irradiated with excitation light in a state in which a substrate on which the phosphor layer is provided is rotated. The rotary fluorescent plate thus produces illumination light containing the fluorescence.

JP-A-2016-70947 discloses a "wavelength conversion element" including a substrate, a reflector provided on the substrate, a wavelength conversion layer provided on a surface of the reflector that is the surface opposite the substrate, and a reflection surface provided between the reflector and a surface of the wavelength conversion layer that is the surface opposite the reflector and totally reflecting fluorescence incident on the reflection surface at angles of incidence greater than or equal to the critical angle associated with the reflection surface. JP-A-2016-70947 further discloses a configuration in which an intermediate layer made, for example, of a silicone resin having a refractive index smaller than the refractive index of the wavelength conversion layer is provided between the wavelength conversion layer and the reflector.

JP-A-2014-192127 discloses a "fluorescence light source apparatus" including an excitation light source, a wavelength conversion member that converts excitation light from the excitation light source in terms of wavelength into fluorescence, and a base that supports the wavelength conversion member, with a fluorescence reflection surface provided on a surface of the wavelength conversion member that is the surface facing away from the surface on which the excitation light is incident. JP-A-2014-192127 further discloses a configuration in which a fluorescence reflection mirror provided on the base is separate from the wavelength conversion member and an air layer is provided between the fluorescence reflection mirror and the wavelength conversion member.

The wavelength conversion elements described in JP-A-2016-70947 and JP-A-2014-192127 are each a wavelength conversion element in which the fluorescence produced in the wavelength conversion layer is reflected and extracted out of the wavelength conversion element or what is called a reflective wavelength conversion element. In a wavelength conversion element of this type, a reflection surface that reflects the fluorescence is provided on a side of the wavelength conversion layer that is the side opposite the excitation light incident surface. The wavelength conversion element, however, has a problem of a fluorescence loss that occurs when the fluorescence is reflected off the reflection surface, resulting in a decrease in light emission efficiency.

SUMMARY

An advantage of some aspects of the invention is to provide a wavelength conversion element capable of suppressing a decrease in light emission efficiency. Another advantage of some aspects of the invention is to provide a method for manufacturing the wavelength conversion element capable of suppressing a decrease in light emission efficiency. Another advantage of some aspects of the invention is to provide an illuminator including the wavelength conversion element described above. Another advantage of some aspects of the invention is to provide a projector including the illuminator described above.

A wavelength conversion element according to an aspect of the invention includes a base having a reflection surface, a wavelength conversion section that has a first surface on which excitation light that belongs to a first wavelength band is incident and a second surface facing away from the first surface and converts the excitation light in terms of wavelength into fluorescence that belongs to a second wavelength band different from the first wavelength band, and a bonding section that bonds the wavelength conversion section to the base. Bonding the wavelength conversion section to the base via the bonding section with the reflection surface and the second surface separate from each other provides an air layer in part of a space between the reflection surface and the second surface, and at least part of a portion of the first surface that is a portion facing the air layer is a light incident area on which the excitation light is incident.

A term "light emission efficiency" in the present specification is defined by the following Expressions (1) and (2).

$$\text{Light emission efficiency} = \text{(amount of light that exits from wavelength conversion layer/amount of excitation light incident on wavelength conversion layer)} \quad (1)$$

$$\text{Amount of light that exits from wavelength conversion layer} = \text{amount of emitted fluorescence} + \text{amount of outputted non-converted excitation light} \quad (2)$$

In the wavelength conversion element according to the aspect of the invention, the bonding section may include a maintaining member that maintains a distance between the reflection surface and the second surface.

In the wavelength conversion element according to the aspect of the invention, the bonding section may have an opening that allows a space surrounded by the base, the wavelength conversion section, and the bonding section to communicate with an external space.

In the wavelength conversion element according to the aspect of the invention, the wavelength conversion section may include a wavelength conversion layer and a dielectric multilayer film provided on a surface of the wavelength conversion layer that is a surface facing the reflection surface.

A method for manufacturing a wavelength conversion element according to another aspect of the invention includes providing a base having a reflection surface, providing a wavelength conversion section having a first surface and a second surface, applying a bonding material containing a maintaining member to at least one of part of the reflection surface and part of the second surface, placing the wavelength conversion section and the base via the bonding material in such a way that the reflection surface and the second surface face each other, and curing the bonding material with a distance between the reflection surface and the second surface maintained by the maintaining member to form a bonding section.

An illuminator according to another aspect of the invention includes the wavelength conversion element according to the aspect of the invention described above and a light source that outputs the excitation light toward the wavelength conversion element.

In the illuminator according to the other aspect of the invention, the wavelength conversion element may be configured to be rotatable around an axis of rotation, and the illuminator may further include a rotator that rotates the wavelength conversion element around the axis of rotation.

A projector according to another aspect of the invention includes the illuminator according to the other aspect of the invention described above, a light modulator that modulates light from the illuminator in accordance with image information, and a projection optical apparatus that projects the light modulated by the light modulator.

BRIEF DESCRIPTION OF THE DRAWINGS

The invention will be described with reference to the accompanying drawings, wherein like numbers reference like elements.

DESCRIPTION OF EXEMPLARY EMBODIMENTS

First Embodiment

A first embodiment of the invention will be described below with reference to FIGS. 1 to 4.

In the following drawings, components are drawn at different dimensional scales in some cases for clarity of each of the components.

An example of a projector according to the present embodiment will be described.

The projector according to the present embodiment is a projection-type image display apparatus that displays color video images on a screen (projection surface). The projector includes three light modulators corresponding to the following color light fluxes: red light; green light; and blue light. The projector further includes a semiconductor laser, which produces high-luminance, high-power light, as a light source of an illuminator.

Figure 1:
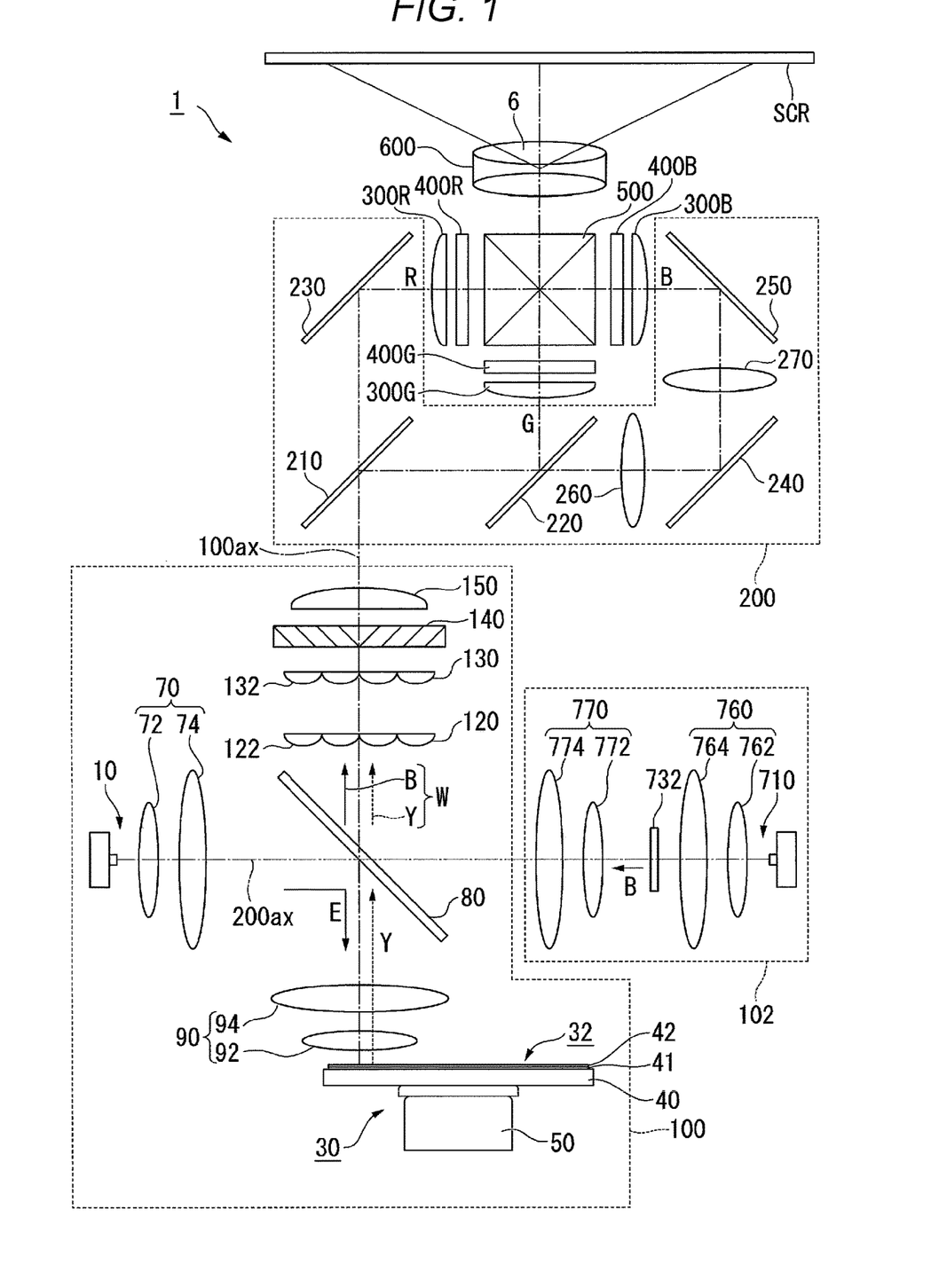
FIG. 1 is a schematic configuration diagram of a projector according to a first embodiment.

FIG. 1 is a schematic view showing the optical system of a projector 1 according to the present embodiment.

The projector 1 according to the present embodiment includes a first illuminator 100, a second illuminator 102, a color separation/light guide system 200, a light modulator 400R, a light modulator 400G, a light modulator 400B, a light combining element 500, and a projection optical apparatus 600, as shown in FIG. 1.

The first illuminator 100 according to the present embodiment corresponds to the illuminator in the appended claims.

The first illuminator 100 includes a first light source 10, a collimation system 70, a dichroic mirror 80, a collimation/light collection system 90, a wavelength converter 30, a first lens array 120, a second lens array 130, a polarization conversion element 140, and a superimposing lens 150.

The first light source 10 is formed of a semiconductor laser that outputs blue excitation light E, which has emitted light intensity that peaks, for example, at 445 nm and which belongs to a first wavelength band that ranges, for example, from 440 to 450 nm. The first light source 10 may be formed of a single semiconductor laser or a plurality of semiconductor lasers. The first light source 10 is so disposed that an optical axis 200ax of the laser beam outputted from the first light source 10 is perpendicular to an illumination optical axis 100ax. The first light source 10 may instead be formed of a semiconductor laser that outputs excitation light having a peak wavelength other than 445 nm, for example, a peak wavelength of 460 nm.

The first light source 10 in the present embodiment corresponds to the light source in the appended claims.

The collimation system 70 includes a first lens 72 and a second lens 74. The collimation system 70 roughly parallelizes the light outputted from the first light source 10. The first lens 72 and the second lens 74 are each formed of a convex lens.

The dichroic mirror 80 is so disposed in the optical path between the collimation system 70 and the collimation/light collection system 90 as to intersect by 45° with respect to both the optical axis 200ax of the first light source 10 and the illumination optical axis 100ax. The dichroic mirror 80 reflects the excitation light E and transmits yellow fluorescence Y containing a red light component and a green light component.

The collimation/light collection system 90 has the function of focusing the excitation light E having reflected via the dichroic mirror 80 and causing the focused excitation light E to enter a wavelength conversion layer of the wavelength converter 30 and the function of roughly parallelizing the fluorescence Y outputted from the wavelength converter 30. The collimation/light collection system 90 includes a first lens 92 and the second lens 94. The first lens 92 and the second lens 94 are each formed of a convex lens.

The second light source apparatus 102 includes a second light source 710, a light collection system 760, a diffuser 732, and a collimation system 770.

The second light source 710 is formed of a semiconductor laser identical to the semiconductor laser that forms the first light source 10 of the first illuminator 100. The second light source 710 may be formed of a single semiconductor laser or a plurality of semiconductor lasers. The second light source 710 may be formed of a semiconductor laser that outputs light that belongs to a wavelength band different from the wavelength band to which the light outputted from the semiconductor laser of the first light source 10 belongs.

The light collection system 760 includes a first lens 762 and a second lens 764. The light collection system 760 collects blue light B outputted from the second light source 710 on a diffusion surface of the diffuser 732 or in the vicinity of the diffuser 732. The first lens 762 and the second lens 764 are each formed of a convex lens.

The diffuser 732 diffuses the blue light B from the second light source 710 to produce blue light B having a light orientation distribution close to the light orientation distribution of the fluorescence Y outputted from the wavelength converter 30. The diffuser 732 can, for example, be a ground glass plate made of optical glass.

The collimation system 770 includes a first lens 772 and a second lens 774. The collimation system 770 roughly parallelizes the light having exited out of the diffuser 732. The first lens 772 and the second lens 774 are each formed of a convex lens.

The blue light B outputted from the second illuminator 102 is reflected off the dichroic mirror 80 and combined with the fluorescence Y having been outputted from the wavelength converter 30 and having passed through the dichroic mirror 80 into white light W. The white light W enters the first lens array 120. The configuration of the wavelength converter 30 will be described later in detail.

The first lens array 120 includes a plurality of first lenses 122 for dividing the light from the dichroic mirror 80 into a plurality of sub-light fluxes. The plurality of first lenses 122 are arranged in a matrix in a plane perpendicular to the illumination optical axis 100ax.

The second lens array 130 includes a plurality of second lenses 132 corresponding to the plurality of first lenses 122 of the first lens array 120. The second lens array 130, along with the downstream superimposing lens 150, forms images of the first lenses 122 of the first lens array 120 in the vicinity of an image formation area of each of the light modulators 400R, 400G, and 400B. The plurality of second lenses 132 are arranged in a matrix in a plane perpendicular to the illumination optical axis 100ax.

The polarization conversion element 140 converts the plurality of divided sub-light fluxes from the first lens array 120 into linearly polarized light fluxes having an aligned polarization direction.

The superimposing lens 150 collects the sub-light fluxes having exited out of the polarization conversion element 140 and superimposes the collected sub-light fluxes on one another in the vicinity of the image formation area of each of the light modulators 400R, 400G, and 400B. The first lens array 120, the second lens array 130, and the superimposing lens 150 form an optical integration system that homogenizes the in-plane optical intensity distribution of the light from the wavelength converter 30.

The color separation/light guide system 200 includes a dichroic mirror 210, a dichroic mirror 220, a reflection mirror 230, a reflection mirror 240, a reflection mirror 250, a relay lens 260, and a relay lens 270. The color separation/light guide system 200 separates the white light W produced from the light from the first illuminator 100 and the light from the second illuminator 102 into red light R, green light G, and blue light B and guides the red light R, the green light G, and the blue light B to the corresponding light modulators 400R, 400G, and 400B.

A field lens 300R is disposed between the color separation/light guide system 200 and the light modulator 400R. A field lens 300G is disposed between the color separation/light guide system 200 and the light modulator 400G. A field lens 300B is disposed between the color separation/light guide system 200 and the light modulator 400B.

The dichroic mirror 210 transmits a red light component and reflects a green light component and a blue light component. The dichroic mirror 220 reflects the green light component and transmits the blue light component. The reflection mirror 230 reflects the red light component. The reflection mirrors 240 and 250 reflect the blue light component.

The red light having passed through the dichroic mirror 210 is reflected off the reflection mirror 230, passes through the field lens 300R, and is incident on the image formation area of the light modulator 400R for red light. The green light reflected off the dichroic mirror 210 is further reflected off the dichroic mirror 220, passes through the field lens 300G, and is incident on the image formation area of the light modulator 400G for green light. The blue light having passed through the dichroic mirror 220 travels via the relay lens 260, the light-incident-side reflection mirror 240, the relay lens 270, the light-exiting-side reflection mirror 250, and the field lens 300B and is incident on the image formation area of the light modulator 400B for blue light.

The light modulators 400R, 400G, and 400B each modulate the color light incident thereon in accordance with image information to form an image light flux. The light modulators 400R, 400G, and 400B are each formed of a liquid crystal light valve. Although not shown, light-incident-side polarizers are disposed on the light incident side of the light modulators 400R, 400G, and 400B. Light-exiting-side polarizers are disposed on the light exiting side of the light modulators 400R, 400G, and 400B.

The light combining element 500 combines the image light fluxes outputted from the light modulators 400R, 400G, and 400B with one another to form full-color image light. The light combining element 500 is formed of a cross dichroic prism having a configuration in which four right-angle prisms are bonded to each other and therefore having a roughly square shape in a plan view. Dielectric multilayer films are provided on the roughly X-letter-shaped interface between the bonded right-angle prisms.

The image light having exited out of the light combining element 500 is enlarged and projected by the projection optical apparatus 600 and forms an image on a screen SCR. That is, the projection optical apparatus 600 projects the light fluxes modulated by the light modulators 400R, 400G, and 400B. The projection optical apparatus 600 is formed of a plurality of projection lenses 6.

The wavelength converter 30 will be described below.

Figure 2:
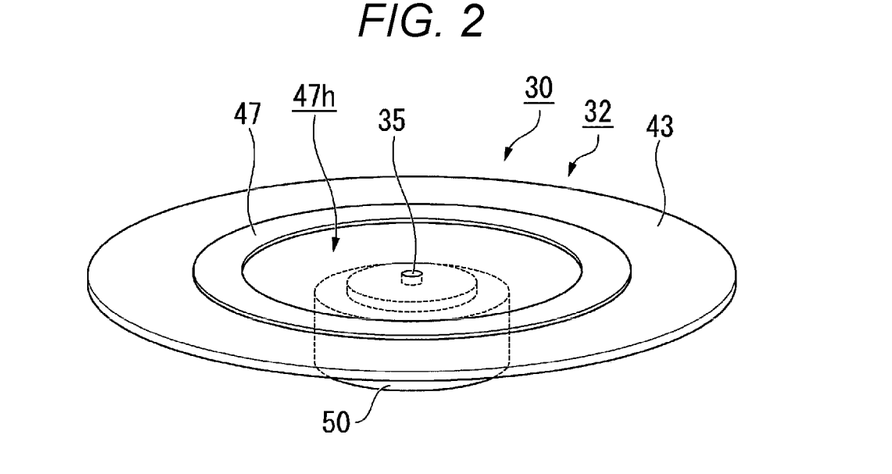
FIG. 2 is a perspective view of a wavelength converter in the first embodiment.
Figure 3:
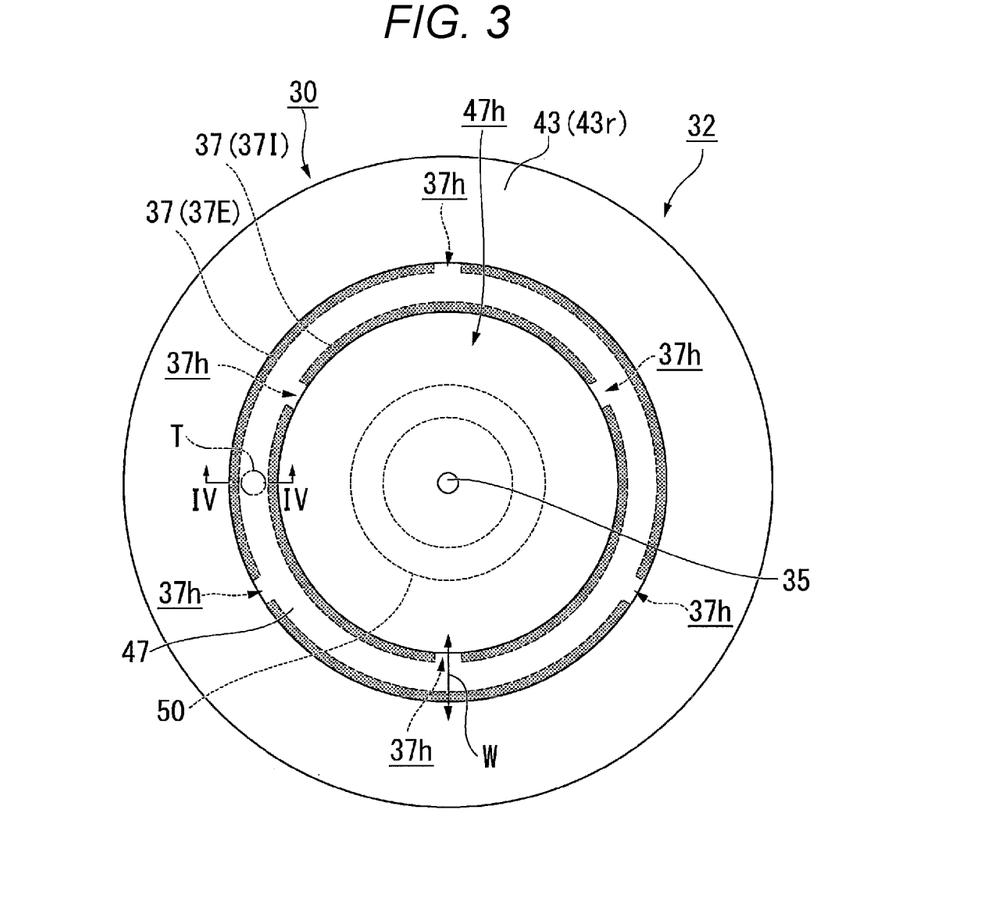
FIG. 3 is a plan view of the wavelength converter.
Figure 4:
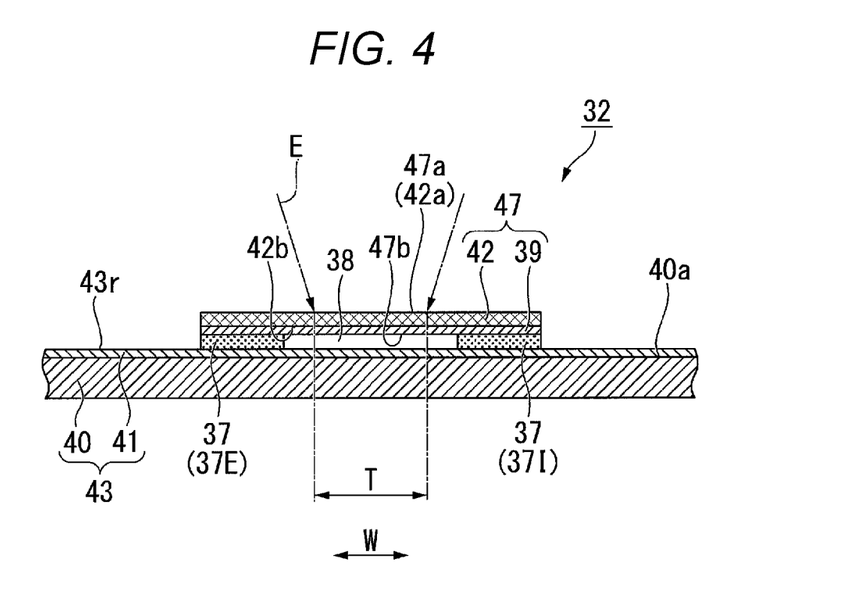
FIG. 4 is a cross-sectional view of a wavelength conversion element taken along the line IV-IV in FIG. 3.

FIG. 2 is a perspective view showing the wavelength converter 30. FIG. 3 is a plan view of the wavelength converter 30. FIG. 4 is a cross-sectional view of a wavelength conversion element 32 taken along the line IV-IV in FIG. 3.

The wavelength converter 30 in the present embodiment includes the wavelength conversion element 32 and a motor 50 (rotator), as shown in FIGS. 2 and 3.

The wavelength conversion element 32 is configured to be rotatable around an axis of rotation 35. The motor 50 rotates the wavelength conversion element 32 around the axis of rotation 35.

The wavelength conversion element 32 according to the present embodiment includes a base 43, a wavelength conversion section 47, a bonding section 37, and an air layer 38, as shown in FIG. 4. The wavelength conversion element 32 emits the fluorescence Y toward the same side as the side on which the excitation light E is incident. That is, the wavelength conversion element 32 is a reflective wavelength conversion element.

The base 43 includes a base main body 40 and a reflection layer 41. The base main body 40 is made of a material containing a metal. As an example, the base main body 40 is formed of a circular plate made of a metal having high thermal conductivity, such as aluminum and copper.

The reflection layer 41 is provided across a first surface 40a of the base main body 40. The reflection layer 41 reflects the fluorescence Y, which exits through a second surface 47b of the wavelength conversion section 47, and the excitation light E. The reflection layer 41 is made, for example, of a metal having high reflectance, such as silver. The reflection layer 41 is so designed as to reflect the fluorescence Y and the excitation light E at high reflectance. To form the thus designed reflection layer 41 having a smooth surface, the first surface 40a of the base main body 40 has high smoothness. The thus formed reflection layer 41 reflects the majority of the fluorescence Y upward (toward side opposite base main body 40). That is, the base 43 has a reflection surface 43r, which reflects the fluorescence Y.

A protective film that is not shown may be provided on a side of the reflection layer 41 that is the side on which the excitation light E is incident. The protective film is formed, for example, of a transparent film made, for example, of $SiO_2$ and $Al_2O_3$. In the case where a protective film is provided, the reflection layer 41 not only can be protected from an external atmosphere but can reflect the fluorescence Y incident on the surface of the base 43 at a variety of angles at high reflectance. A protective layer that is not shown but prevents the reflection layer 41 from being degraded may further be provided between the reflection layer 41 and the base main body 40.

The wavelength conversion section 47 has a circular-ring-like shape having an opening 47h around the axis of rotation 35 of the base 43, as shown in FIGS. 2 and 3. That is, the wavelength conversion section 47 is so provided as to surround the axis of rotation 35 on a side of the reflection surface 43r of the base 43.

The wavelength conversion section 47 includes the wavelength conversion layer 42 and a dielectric multilayer film 39, which is provided on a surface of the wavelength conversion layer 42 that is the surface facing the reflection surface 43r, as shown in FIG. 4. The wavelength conversion section 47 has a first surface 47a, on which the excitation light E, which belongs to the first wavelength band, is incident, and a second surface 47b, which faces away from the first surface 47a.

The wavelength conversion layer 42 has a first surface 42a, on which the excitation light E, which belongs to the first wavelength band, is incident, and a second surface 42b, which faces away from the first surface 42a. The wavelength conversion layer 42 contains a ceramic phosphor that converts the excitation light E in terms of wavelength into the fluorescence Y, which belongs to a wavelength band different from the wavelength band to which the excitation light E belongs. That is, the wavelength conversion layer 42 converts the excitation light E in terms of wavelength into the fluorescence Y, which belongs a second wavelength band different from the first wavelength band. The second wavelength band ranges, for example, from 490 to 750 nm, and the fluorescence Y is yellow light containing the red light component and the green light component. The wavelength conversion layer 42 may contain a single crystal phosphor.

The wavelength conversion layer 42 contains, for example, an yttrium-aluminum-garnet-based (YAG-based) phosphor. Consider YAG:Ce, which contains cerium (Ce) as an activator by way of example, and the wavelength conversion layer 42 can be made, for example, of a material produced by mixing raw material powder containing $Y_2O_3$, $Al_2O_3$, $CeO_2$, and other constituent elements with one another and causes the mixture to undergo a solid-phase reaction, Y—Al—O amorphous particles produced by using a coprecipitation method, a sol-gel method, or any other wet method, or YAG particles produced by using a spray-drying method, a flame-based thermal decomposition method, a thermal plasma method, or any other gas-phase method.

The dielectric multilayer film 39 is provided on the second surface 42b of the wavelength conversion layer 42. The dielectric multilayer film 39 is a film produced by alternately layering an $SiO_2$ layer and a $TiO_2$ layer on each other multiple times. That is, the dielectric multilayer film 39 has a configuration in which two types of dielectric films having different refractive indices are alternately layered on each other. The number of dielectric films that form the dielectric multilayer film 39 is not limited to a specific number.

When the excitation light E is incident on the wavelength conversion section 47, heat is generated in the wavelength conversion section 47. In the present embodiment, rotating the wavelength conversion element 32 with the motor allows the position where the excitation light E is incident on the wavelength converter 47 to change over time. The rotation of the wavelength conversion element 32 avoids a situation in which the excitation light E keeps impinging on the same position on the wavelength conversion section 47 so that only part of the wavelength conversion section 47 is locally heated and therefore degraded. In FIG. 3, the circle labeled with the reference character T represents the area on which the excitation light E is incident.

The bonding section 37 bonds the wavelength conversion section 47 to the base 43, as shown in FIG. 4. The bonding section 37 is desirably made of a transparent adhesive to suppress absorption and reflection of the light incident on the bonding section 37. Examples of an adhesive of this type may include a thermoset silicone resin, an epoxy resin, an acrylic resin, and an inorganic adhesive.

The bonding section 37 is provided in an area of the first surface 47a of the wavelength conversion section 47 that is the area excluding the light incident area T, on which the excitation light E is incident. In other words, the bonding section 37 includes a bonding section provided in an area shifted from the light incident area T, on which the excitation light E is incident, toward the inner side of the wavelength conversion section 47 (bonding section 37I in right portion of FIG. 4), and a bonding section provided in an area shifted from the light incident area T, on which the excitation light E is incident, toward the outer side of the wavelength conversion section 47 (bonding section 37E in left portion of FIG. 4).

That is, the bonding section 37 is not provided across the second surface 47b of the wavelength conversion section 47 and bonds the wavelength conversion section 47 to the base 43 in part of the inner and outer circumference sides of the second surface 47b of the wavelength conversion section 47. As a result, in a central portion of the wavelength conversion section 47 in a width direction W, the reflection surface 43r of the base 43 and the second surface 47b of the wavelength conversion section 47 are separate from each other. The width direction W of the wavelength conversion section 47 corresponds to the radial direction of the wavelength conversion section 47 having a circular-ring-like shape.

Bonding the wavelength conversion section 47 to the base 43 via the bonding section 37 with the reflection surface 43r and the second surface 42b separate from each other provides the air layer 38 in part of the space between the reflection surface 43r and the second surface 42b, as shown in FIG. 4. The thickness of the air layer 38 is roughly equal to the thickness of the bonding section 37 and ranges from about 1 to 2 μm. At least part of a portion of the first surface 47a of the wavelength conversion section 47 that is the portion facing the air layer 38 is the light incident area T, on which the excitation light E is incident.

Each of the bonding sections 37I and 37E is cut at several circumferential positions and therefore has a plurality of openings 37h, as shown in FIG. 3. In the present embodiment, the bonding sections 37I and 37E each have three openings 37h, but the number of openings 37h is not limited to a specific number. Further, in the present embodiment, the opening 37h in the inner-side bonding section 37I and the opening 37h in the outer-side bonding section 37E are so provided as not to overlap with each other in the width direction W, but the positions of the openings 37h in each of the bonding sections 37I and 37E are not limited to specific positions.

As described above, providing the openings 37h in the bonding section 37 prevents the space surrounded by the base 43, the wavelength conversion section 47, and the bonding section 37 from being sealed but allows the space to communicate with the space outside the wavelength conversion element 32. In other words, the openings 37h in the bonding section 37 allow the space surrounded by the base 43, the wavelength conversion section 47, and the bonding section 37 to communicate with the external space.

In the wavelength conversion element 32 according to the present embodiment, the fluorescence Y isotropically emitted in the wavelength conversion layer 42 impinges on air holes and other scattering components and is scattered, and the scattered fluorescence Y travels through the wavelength conversion layer 42. Part of the fluorescence Y reaches the first surface 47a of the wavelength conversion section 47, and another part of the fluorescence Y reaches the second surface 47b of the wavelength conversion section 47. The fluorescence Y having reached the first surface 47a is formed of components that are incident on the first surface 47a at angles greater than or equal to the critical angle associated with the first surface 47a and are therefore totally reflected, components that are incident on the first surface 47a at angles smaller than the critical angle and therefore undergo Fresnel reflection, and the remaining components. The remaining components pass through the first surface 42a and exit out of the wavelength conversion element 32. The two reflected components described above are scattered again, travel through the wavelength conversion section 47, and reach the first surface 47a or the second surface 47b.

On the other hand, out of the fluorescence Y having reached the second surface 47b, the light incident on the second surface 47b (interface between wavelength conversion section 47 and air layer 38) at angles of incident greater than or equal to the critical angle associated with the second surface 47b travels through the wavelength conversion section 47 while being scattered again with no loss because the light is totally reflected.

Out of the fluorescence Y having been incident on the second surface 47b (interface between wavelength conversion section 47 and air layer 38) at angles of incidence smaller than the critical angle, the components that have not been reflected off the wavelength conversion layer 42 or the dielectric multilayer film 39 pass through the second surface 47b and are reflected off the reflection layer 41 of the base 43. The fluorescence Y is, however, attenuated whenever the fluorescence Y is incident on the reflection layer 41 because the reflection layer 41 absorbs the fluorescence Y by about 2% thereof although the reflection layer 41 made of silver has high reflectance. Out of the fluorescence Y emitted in the wavelength conversion layer 42, the majority of the components that do not exit out of the wavelength conversion element 32 correspond to the components absorbed by the reflection layer 41. Therefore, to minimize the amount of fluorescence Y incident on the reflection layer 41 to increase the light emission efficiency, it is important to maximize the amount of fluorescence Y reflected off the second surface 47b.

The fluorescence Y is emitted in the wavelength conversion layer 42 in all directions, and the emission distribution of the fluorescence Y is therefore roughly isotropic. Therefore, the smaller the critical angle associated with the second surface 47a (interface between wavelength conversion section 47 and air layer 38) is, the greater the amount of fluorescence Y reflected off the second surface 47b, whereby the amount of fluorescence Y incident on the reflection layer 41 can be reduced. In the wavelength conversion element 32 according to the present embodiment, since the air layer 38 is provided below the light incident area T, on which the excitation light E is incident and which corresponds to the primary light emission area of the wavelength conversion layer 42, the critical angle associated with the second surface 47b can be smaller than that in a wavelength conversion element of related art including no air layer. Therefore, the amount of fluorescence Y incident on the reflection layer 41 can be reduced, and the loss of the fluorescence Y at the reflection layer 41 can be reduced accordingly, whereby the light emission efficiency can be increased.

The result of an experiment conducted by the present inventor indicates that the wavelength conversion element 32 according to the present embodiment provides light emission efficiency higher by a factor of 1.04 than the light emission efficiency of a wavelength conversion element of related art in which the space between the wavelength conversion layer and the base is filled with a silicone resin.

The wavelength conversion element 32 according to the first embodiment described above provides the following effects.

In the wavelength conversion element 32 according to the present embodiment, at least part of a portion of the first surface 42a (first surface 47a), on which the excitation light E is incident, that is the portion facing the air layer 38 is the light incident area T, on which the excitation light E is incident. The excitation light E incident on the light incident area T is converted in terms of wavelength into the fluorescence Y, and part of the isotropically emitted fluorescence Y reaches the second surface 47b of the wavelength conversion section 47. In the wavelength conversion element 32 according to the present embodiment, since the second surface 47b of the wavelength conversion section 47 is the interface between the wavelength conversion section 47 and the air layer 38, the critical angle associated with the second surface 47b is smaller than that in the configuration of related art in which no air layer 38 is provided, whereby the amount of fluorescence Y that reaches the second surface 47b and is reflected off the second surface 47b increases. The amount of fluorescence Y that passes through the second surface 47b of the wavelength conversion section 47 and reaches the reflection surface 43r of the base 43 (base main body 40) therefore decreases, whereby the loss of the fluorescence Y at the reflection surface 43r can be suppressed. The light emission efficiency of the wavelength conversion element 32 can thus be increased.

Further, the heat generated by the wavelength conversion is conducted from the wavelength conversion section 47 to the base 43, then diffused across the base 43, and dissipated through the entire surface of the base 43. Therefore, in a case where the member interposed between the wavelength conversion section 47 and the base 43 has high thermal resistance, the heat dissipation is insufficient, undesirably resulting in an increase in the temperature of the wavelength conversion section 47 and a problem of a decrease in the light emission efficiency due to temperature quenching. To solve the problem, in the wavelength conversion element 32 according to the present embodiment, the air layer 38 interposed between the wavelength conversion section 47 and the base 43 has a small thickness ranging from about 1 to 2 μm, so that the air layer 38 made of air, which has low thermal conductivity, does not have high thermal resistance, whereby the high light emission efficiency can be maintained.

In the wavelength conversion element 32 according to the present embodiment, since the openings 37h, which allow the space surrounded by the base 43, the wavelength conversion section 47, and the bonding section 37 to communicate with the external space, are provided, the space is not a sealed space, and air can freely travel between the space and the external space. Expansion of the air layer 38 and enlargement thereof due to an increase in temperature resulting from the heat generated when the wavelength conversion section 47 emits the fluorescence Y can therefore be avoided, and an increase in the thermal resistance between the wavelength conversion section 47 and the base 43 can in turn be avoided. A decrease in the light emission efficiency resulting from an increase in the thermal resistance can therefore be avoided. Further, breakage of the wavelength conversion section 47 due to the expansion of the air layer 38 resulting from the increase in temperature due to the heat generated by the wavelength conversion section 47 can be avoided. Moreover, Separation or fall of the wavelength conversion section 47 from the base 43 due to the expansion of the air layer 38 resulting from the increase in temperature due to the heat generated by the wavelength conversion section 47 can be avoided. Further, compression of the air in a sealed space that may occur when the wavelength conversion section 47 is bonded to the base 43 and a resultant difficulty in the bonding can be avoided.

Further, in the wavelength conversion element 32 according to the present embodiment, the dielectric multilayer film 39 is provided on the second surface 42b of the wavelength conversion layer 42. Therefore, out of the fluorescence Y incident on the second surface 47b of the wavelength conversion section 47 at angles of incidence smaller than or equal to the critical angle, the amount of fluorescence Y reflected off the second surface 47b can be increased by the dielectric multilayer film 39. The amount of fluorescence Y that reaches the reflection surface 43r of the base 43 can therefore be reduced, whereby the loss of the fluorescence Y at the reflection surface 43r can be reduced. As a result, the light emission efficiency of the wavelength conversion element 32 can be increased.

The first illuminator 100 according to the first embodiment described above provides the following effects.

The first illuminator 100 according to the present embodiment, which includes the wavelength conversion element 32 described above, can be an illuminator capable of suppressing a loss of fluorescence in the wavelength conversion element.

Further, the first illuminator 100 according to the present embodiment, in which the motor 50 (rotator) can move over time the position where the excitation light E is incident on the wavelength conversion layer 42, can suppress an increase in the temperature of the wavelength conversion layer 42. The first illuminator 100 provided by the present embodiment can not only suppress a decrease in the light emission efficiency of the wavelength conversion layer 42 but reduce a loss of the fluorescence Y.

The projector 1 according to the present embodiment described above provides the following effect.

The projector 1 according to the present embodiment, which includes the first illuminator 100 described above, can display a high-luminance image.

Second Embodiment

A second embodiment of the invention will be described below with reference to FIG. 5.

The configurations of a projector and an illuminator according to the second embodiment are the same as those in the first embodiment, and the configuration of the wavelength conversion element differs from that in the first embodiment. No overall description of the projector and the illuminator will be omitted.

Figure 5:
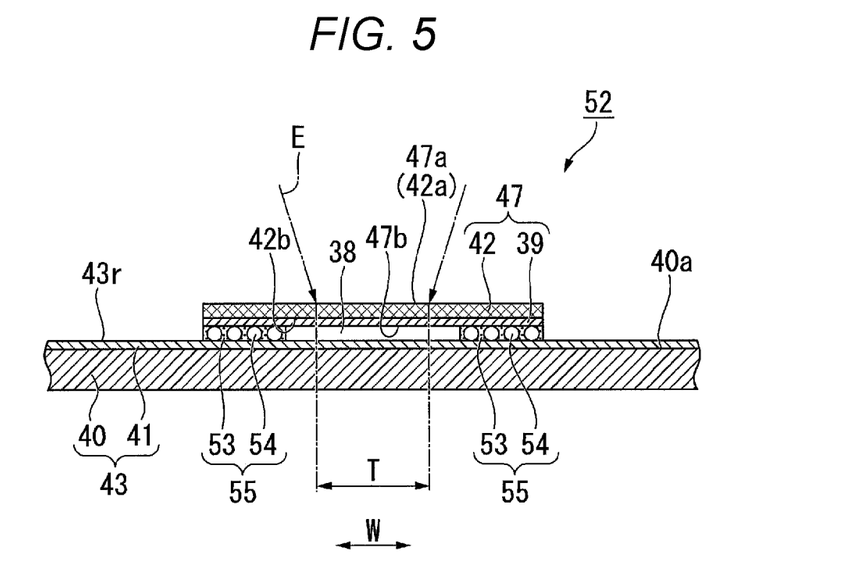
FIG. 5 is a cross-sectional view of a wavelength converter according to a second embodiment.

FIG. 5 is a cross-sectional view of a wavelength conversion element according to the second embodiment. The cross-sectional view corresponds to the cross section taken along the line IV-IV in FIG. 3, as in FIG. 4.

In FIG. 5, components common to those in FIG. 4 have the same reference characters and will not be described.

A wavelength conversion element 52 according to the present embodiment includes the base 43, the wavelength conversion section 47, a bonding section 55, and the air layer 38, as shown in FIG. 5.

The bonding section 55 includes a resin section and a plurality of maintaining members 54, which are contained in the resin section 53. The resin section 53 is made, for example, of a thermoset silicone resin. The maintaining members 54 maintain the distance between the reflection surface 43r and the second surface 42b. The maintaining members 54 are formed of spherical particles each having a diameter ranging from about 1 to 2 μm. The maintaining members 54 are formed of spherical particles made, for example, of silica. The plurality of maintaining members 54 are sandwiched between the wavelength conversion layer 42 and the base 43 with the maintaining members 54 so arranged in a single layer without overlapping with each other. The maintaining members 54 are each so rigid that the maintaining member 54 itself is not deformed in the state in which it is sandwiched between the wavelength conversion layer 42 and the base 43.

The other configurations of the wavelength conversion element 52 are the same as those of the wavelength conversion element 32 according to the first embodiment.

To manufacture the wavelength conversion element 52 according to the present embodiment, the base 43 having the reflection surface 43r is provided.

Further, the wavelength conversion section 47 having the first surface 47a and the second surface 47b is provided.

Thereafter, a plurality of silica particles each having a diameter ranging from 1 to 2 μm are so added into a thermoset silicone resin that a predetermined concentration of the silica particles that prevents the silica particles from overlapping with each other is achieved when a bonding material that will be described later is applied, and the mixture is so stirred that the silica particles are uniformly dispersed. A bonding material with the plurality of maintaining members 54 kneaded in the silicone resin is thus prepared.

The bonding material described above containing the maintaining members 54 is then applied in a circular-ring-like shape onto a predetermined position on the reflection surface 43r of the base 43. The predetermined position described above is the position facing the second surface 47b when the reflection surface 43r of the base 43 is caused to face the second surface 47b of the wavelength conversion section 47 in the following step. At this point, the bonding material is so applied that the circular ring made of the bonding material is cut at a plurality of locations.

Instead, the bonding material containing the maintaining members 54 may be applied in a circular-ring-like shape in a predetermined position on the second surface 47b of the wavelength conversion section 47. Also in this case, the bonding material is so applied that the circular ring made of the bonding material is cut at a plurality of locations. Still instead, the bonding material described above containing the maintaining members 54 may be applied in a circular-ring-like shape both in a predetermined position on the reflection surface 43r and a predetermined position on the second surface 47b of the wavelength conversion section 47. That is, in the present step, the bonding material described above containing the maintaining members 54 may be applied in a circular-ring-like shape in at least one of a predetermined position on the reflection surface 43r and a predetermined position on the second surface 47b of the wavelength conversion section 47.

The wavelength conversion section 47 is then so positioned via the bonding material in a predetermined position on the base 43 that the reflection surface 43r of the base 43 faces the second surface 47b of the wavelength conversion section 47.

Pressure and heat are then applied with the maintaining members 54 maintaining the distance between the reflection surface 43r and the second surface 42b, and the bonding material is cured to form the bonding section 55. The wavelength conversion section 47 is thus bonded to the base 43.

The wavelength conversion element 52 according to the present embodiment is thus manufactured by carrying out the above steps.

That is, the method for manufacturing the wavelength conversion element 52 according to the present embodiment includes providing the base 43 having the reflection surface 43r, providing the wavelength conversion section 47 having the first surface 47a and the second surface 47b, applying the bonding material containing the maintaining members 54 to at least one of part of the reflection surface 43r and part of the second surface 47b, placing the wavelength conversion section 47 and the base 43 via the bonding material in such a way that the reflection surface 43r and the second surface 42b face each other, and curing the bonding material with the distance between the reflection surface 43r and the second surface 42b maintained by the maintaining members 54 to form the bonding section 55.

Also in the present embodiment, since the loss of the fluorescence Y at the reflection layer 41 can be reduced, the same effects provided in the first embodiment can be provided, such as an increase in the light emission efficiency.

Since the thermal conductivity of air is lower than the thermal conductivity of a resin, such as a silicone resin that is the material of the bonding section 55, it is necessary to control the thickness of the air layer 38 to have a sufficiently small predetermined value not to increase the thermal resistance between the wavelength conversion layer 42 and the base 43.

To this end, it is conceivable to control the thickness of the air layer, for example, by using an approach of making fine adjustment of the viscosity of the bonding material or an approach of using a jig for maintaining the distance between the wavelength conversion section and the base. These approaches are, however, problematic in terms of manufacturing process, for example, labor and time are required to adjust the viscosity of the bonding material, and a special jig is required in the step of bonding the wavelength conversion layer to the base.

To avoid the problems described above, in the method for manufacturing the wavelength conversion element according to the present embodiment, only use of the bonding material to which the maintaining members 54 are added in advance to bond the wavelength conversion section 47 to the base 43 allows the distance between the wavelength conversion layer 42 and the base 43 to coincide with the diameter of the maintaining members 54 so that the air layer 38 has a predetermined thickness. The thickness of the air layer 38 can thus be appropriately be controlled with no increase in labor or time in manufacturing processes. That is, since the maintaining members 54 maintain the distance between the reflection surface 43r and the second surface 47b, adjustment of the size of the maintaining members 54 allows adjustment of the distance between the reflection surface 43r and the second surface 47b (thickness of air layer 38). The thermal resistance between the wavelength conversion section 47 and the base 43 can therefore be reduced by maintaining the distance between the reflection surface 43r and the second surface 47b at a small value, whereby the heat from the wavelength conversion section 47 can be efficiently transferred to the base 43. As a result, a decrease in the light emission efficiency due to the temperature quenching resulting from an increase in the temperature of the wavelength conversion section 47 can be suppressed.

Further, the distance between the wavelength conversion layer 42 and the base 43 can be reliably maintained also after the wavelength conversion element 52 is completed. A wavelength conversion element 52 that excels in the light emission efficiency can thus be provided.

The technical range of the invention is not limited to the embodiments described above, and a variety of changes can be made thereto to the extent that the changes do not depart from the substance of the invention.

For example, in the wavelength conversion element according to each of the embodiments described above, the bonding section has the openings that cause the space surrounded by the base, the wavelength conversion layer, and the bonding section to communicate with the external space. The bonding section may have no opening in a case where the problem with the case where no opening is provided is negligible.

Further, in the wavelength conversion element according to each of the embodiments described above, the dielectric multilayer film is provided on the second surface of the wavelength conversion layer, and the dielectric multilayer film may not necessarily be provided.

In each of the embodiments described above, the wavelength conversion element that is configured to be rotatable with a motor is presented by way of example. The invention is also applicable to a fixed wavelength conversion element that is not configured to be rotatable.

In addition to the above, the specific descriptions of the shape, the number, the arrangement, the material, and other factors of the components of the wavelength converter, the illuminator, and the projector are not limited to those in the embodiments described above and can be changed as appropriate. The above embodiments have been described with reference to the case where the illuminator according to each of the embodiments of the invention is incorporated in a projector using liquid crystal light valves, but not necessarily. The illuminator may be incorporated in a projector using a digital micromirror device as each of the light modulators.

The above embodiments have been described with reference to the case where the illuminator according to each of the embodiments of the invention is incorporated in a projector, but not necessarily. The illuminator according to each of the embodiments of the invention may be used as a lighting apparatus, a headlight of an automobile, and other components.

The entire disclosure of Japanese Patent Application No. 2018-059329, filed on Mar. 27, 2018 is expressly incorporated by reference herein.

What is claimed is:
1. A wavelength conversion element comprising:
a base having a reflection surface;
a wavelength conversion section that has a first surface on which excitation light that belongs to a first wavelength band is incident and a second surface facing away from the first surface and converts the excitation light in terms of wavelength into fluorescence that belongs to a second wavelength band different from the first wavelength band; and a bonding section that bonds the wavelength conversion section to the base, wherein bonding the wavelength conversion section to the base via the bonding section with the reflection surface and the second surface separate from each other provides an air layer in part of a space between the reflection surface and the second surface, the bonding section has an opening that allows a space surrounded by the base, the wavelength conversion section, and the bonding section to communicate with an external space, and at least part of a portion of the first surface overlaying the air layer is a light incident area on which the excitation light is incident.

2. The wavelength conversion element according to claim 1, wherein the bonding section includes a maintaining member that maintains a distance between the reflection surface and the second surface.

3. An illuminator comprising:
the wavelength conversion element according to claim 2; and
a light source that outputs the excitation light toward the wavelength conversion element.

4. A projector comprising:
the illuminator according to claim 3;
a light modulator that modulates light from the illuminator in accordance with image information; and
a projection optical apparatus that projects the light modulated by the light modulator.

5. The wavelength conversion element according to claim 1, wherein the wavelength conversion section includes a wavelength conversion layer and a dielectric multilayer film provided on a surface of the wavelength conversion layer that is a surface facing the reflection surface.

6. An illuminator comprising:
the wavelength conversion element according to claim 5; and
a light source that outputs the excitation light toward the wavelength conversion element.

7. A projector comprising:
the illuminator according to claim 6;
a light modulator that modulates light from the illuminator in accordance with image information; and
a projection optical apparatus that projects the light modulated by the light modulator.

8. An illuminator comprising:
the wavelength conversion element according to claim 1; and
a light source that outputs the excitation light toward the wavelength conversion element.

9. The illuminator according to claim 8,
wherein the wavelength conversion element is configured to be rotatable around an axis of rotation, and
the illuminator further comprises a rotator that rotates the wavelength conversion element around the axis of rotation.

10. A projector comprising:
the illuminator according to claim 9;
a light modulator that modulates light from the illuminator in accordance with image information; and
a projection optical apparatus that projects the light modulated by the light modulator.

11. A projector comprising:
the illuminator according to claim 8;
a light modulator that modulates light from the illuminator in accordance with image information; and
a projection optical apparatus that projects the light modulated by the light modulator.

12. An illuminator comprising:
the wavelength conversion element according to claim 1; and
a light source that outputs the excitation light toward the wavelength conversion element.

13. A projector comprising:
the illuminator according to claim 12;
a light modulator that modulates light from the illuminator in accordance with image information; and
a projection optical apparatus that projects the light modulated by the light modulator.

14. A method for manufacturing a wavelength conversion element comprises:
providing a base having a reflection surface;
providing a wavelength conversion section having a first surface and a second surface;
applying a bonding material containing a maintaining member to at least one of part of the reflection surface and part of the second surface;
placing the wavelength conversion section and the base via the bonding material in such a way that the reflection surface and the second surface overlay each other; and
curing the bonding material with a distance between the reflection surface and the second surface maintained by the maintaining member to form a bonding section
wherein the bonding section has an opening that allows a space surrounded by the base, the wavelength conversion section, and the bonding section to communicate with an external space.

* * * * *